C. F. WASHBURN.
WIRE BALE-TIES.

No. 183,087. Patented Oct. 10, 1876.

Witnesses,
Chas H Smith
Harold Serrell

Inventor
Charles F Washburn.
per Lemuel W. Serrell
atty

JAMES R. OSGOOD & CO BOSTON

UNITED STATES PATENT OFFICE.

CHARLES F. WASHBURN, OF WORCESTER, MASSACHUSETTS.

IMPROVEMENT IN WIRE BALE-TIES.

Specification forming part of Letters Patent No. 183,087, dated October 10, 1876; application filed March 6, 1876.

*To all whom it may concern:*

Be it known that I, CHARLES F. WASHBURN, of Worcester, in the State of Massachusetts, have invented an Improvement in Wire Bale-Ties, of which the following is a specification:

Bale-ties have been made with a hook at one end and a loop at the other end. In some instances the hook has been strengthened by the wire being turned back behind the point of the hook, forming a brace against the loop, and in other instances there has been a loop upon the outer end of the hook, through which the loop at the other end of the bale has been passed previous to being passed over the hook. In the first-named bale-tie the hook is liable to slip, to become misplaced, and to unhook or break.

My invention is made primarily to prevent the hook unhooking by the vibration consequent upon the working of the press before the strain is received upon the bale-tie, also for strengthening the hook by the peculiar shape given to it, and to brace and securely support the hook under strain, so that the attendant can be assured that the tie is properly clasped as soon as the parts are hooked together, and that they will so remain.

My bale-tie is made of wire, preferably steel, that has been drawn once or more through a die after it has been annealed, so that it possesses the proper smoothness and stiffness for making the loops and hooks.

The machinery for bending the wire does not form any part of my invention, as my improvement relates to the article itself.

Figure 1:
Figure 5:

Bale-ties have been made with a loop, *a*, at one end of the wire, which is twisted at *b*, as seen in Figs. 1 and 5, and with a hook near the other end, and with the wire beyond the hook forming a loop. In this case the loop at one end is put through the loop at the other end, and hooked over the hook; but in the ties heretofore made the said hook does not clasp the loop, and hence the vibrating motion to which the bale-ties are subjected in the press as the bale is being compressed renders the loop liable to slip partially or entirely off the hook, and when the strain comes upon the bale the hook is either injured, broken, or the loop slips entirely off it.

Figure 4:
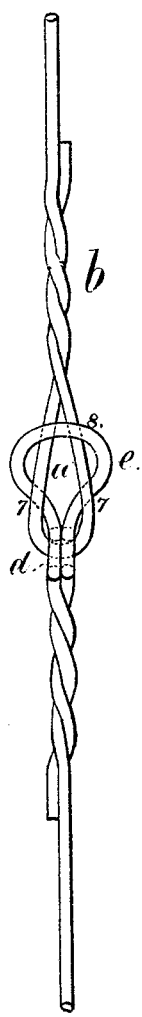
Figure 2:
Figure 3:
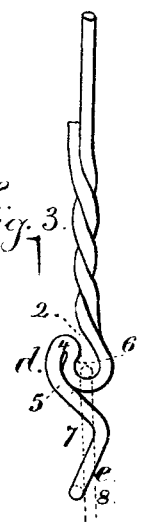

The improvement which I have made is represented by the face view, Fig. 2, edge view, Fig. 3, and face view of the hook and loop, Fig. 4.

The hook *d* is bent to form a clasp or snap-hoop, the opening 2 between the jaws of the hook being of a width less than the diameter of the wire composing the loop *a*, so that said wire will not pass into the hook until a sufficient tension has been applied to the bale-tie to spring the hook slightly open by the wire of the loop *a* that is drawn into such hook. This effectually retains the loop *a* and prevents it slipping out accidentally, or becoming misplaced in any manner.

The second peculiarity of my hook relates to the configuration thereof, as shown in Fig. 3, so that the wire of the loop *a*, where it crosses the hook, is in line with the wire composing the bale-tie; hence the strain upon the bale-tie does not act with any leverage to bend the hook.

The third peculiarity in my hook relates to the loop *e*, extending from the hook end backward. The fold or bend 4 of the wire is as small as possible, so that the part 5 lies against the back of the hook, or nearly so, and the bend 4 leaves a shoulder, 6, against which the loop *a* will strike if there is any tendency to push it back out of the hook, and the hook is strengthened by the support the loop *e* receives from the loop *a*.

The fourth peculiarity in the hook and its loop is that the loop *e* is shaped so that the loop *a* within the loop *e* touches against this loop *e* at the points 7, and also where the extreme portion 8 of the loop *e* crosses the base of the loop *a*. The consequence of this construction is that the hook is very much strengthened.

When under tension the tendency of the hook is to bend back and increase the opening at the jaw of the hook. The contact of the wires of the loops at 7 prevents this bending of the point of the hook outwardly without, at the same time, bending the wires of the loops at 7, and the loop *e*, bearing upon the loop *a* at 8, also tends to support the loop *e*, and stiffen the hook by the loop *e* behind it. When the bale-tie is loose, before tension comes upon it the contact of the loop *a* and *e* at 7 tends to make the end of the loop *a* press against the shoulder 6 within the hook rather than between the jaws of the hook, thereby lessening the risk of the loop getting out of the hook during the time that the pressure is upon the bale.

The wire I make use of is either iron or steel; but it is not in the usual annealed from, for if it was the hooks would bend back under the strain and be useless; but I draw such annealed wire once or twice through a die before using the same, so that the wire is stiff enough to form a hook that will not bend back under the tension to which the wire is subjected.

I claim as my invention—

1. The bale-tie with the wire thereof bent double at the end, twisted together, and bent up into a hook, with the opening 2 of less diameter than the wire of the bale-tie, substantially as set forth.

2. The bale-tie made of stiff wire bent double at the end, twisted together, and bent up into a hook, with the shoulder 6 within the hook, and with the double portion 5 of the wire bent back behind and contiguous to the hook, substantially as and for the purposes set forth.

3. The wire hook formed with the portion of the wire 5 contiguous to the back of the hook, as specified.

4. The combination of the wire hook and shoulder 6 with the loops *a* and *e*, said loops touching each other at the points of crossing 7, to press the loop *a* toward the shoulder 6, for the purposes set forth.

Signed by me this 19th day of February, A. D. 1876.

CHAS. F. WASHBURN.

Witnesses:
HARRY A. WILLARD,
W. F. EMERSON.